(12) United States Patent
Kubo

(10) Patent No.: US 7,030,911 B1
(45) Date of Patent: Apr. 18, 2006

(54) DIGITAL CAMERA AND EXPOSURE CONTROL METHOD OF DIGITAL CAMERA

(75) Inventor: Hiroaki Kubo, Muko (JP)

(73) Assignee: Minolta Co., Ltd., Osaka (JP)

( * ) Notice: Subject to any disclaimer, the term of this patent is extended or adjusted under 35 U.S.C. 154(b) by 826 days.

(21) Appl. No.: 09/669,203

(22) Filed: Sep. 25, 2000

(30) Foreign Application Priority Data

Sep. 28, 1999 (JP) ................................. 11-274400

(51) Int. Cl.
*H04N 5/235* (2006.01)

(52) U.S. Cl. ............................. 348/221.1; 348/222.1; 348/229.1; 348/362

(58) Field of Classification Search ................ 348/349, 348/345, 229, 221.1, 222.1, 229.1, 362
See application file for complete search history.

(56) References Cited

U.S. PATENT DOCUMENTS

| | | | |
|---|---|---|---|
| 3,828,122 A * | 8/1974 | McPhee et al. | 348/170 |
| 4,218,119 A | 8/1980 | Schickedanz | 354/23 D |
| 5,043,816 A * | 8/1991 | Nakano et al. | 348/333.01 |
| 5,220,375 A | 6/1993 | Ishida et al. | 354/419 |
| 5,223,935 A * | 6/1993 | Tsuji et al. | 348/364 |
| 5,490,225 A * | 2/1996 | Kumagai | 382/227 |
| 6,532,264 B1 * | 3/2003 | Kahn | 375/240.16 |

FOREIGN PATENT DOCUMENTS

| | | |
|---|---|---|
| JP | 5-34757 A | 2/1993 |
| JP | 6-308588 A | 11/1994 |
| JP | 08-320511 (A) | 12/1996 |
| JP | 8-327917 | * 12/1996 |
| JP | 8-327917 A | 12/1996 |
| WO | 11-088810 (A) | 3/1999 |

\* cited by examiner

*Primary Examiner*—David L. Ometz
*Assistant Examiner*—Gevell Selby
(74) *Attorney, Agent, or Firm*—Sidley Austin LLP (57) ABSTRACT

Two subject images shot by an imaging section before real exposure are captured, and the difference between data is obtained for each corresponding pixels of the subject images by an interframe difference calculation section. The difference is compared with a threshold value by a threshold value comparison section, the pixels of levels not less than the threshold value level are extracted as a non-correlated portion, and the ratio of the area of the non-correlated portion to all the detected pixels is obtained by a non-correlated portion area calculation section. When the ratio of the area of the non-correlated portion is high, it is determined that the subject movement is large, so that a speed priority program line is selected by an exposure calculation block and the exposure time is set to be shorter than the normal exposure time, thereby preventing subject image blur.

8 Claims, 8 Drawing Sheets

| THE RATIO OF THE NON-CORRELATED AREA | THE BRIGHTNESS OF THE SUBJECT | SELECTED PROGRAM CHARACTERISTIC | | |
|---|---|---|---|---|
| | | DEPTH PRIORITY PROGRAM | STANDARD PROGRAM | SPEED PRIORITY PROGRAM |
| LESS THAN 5% | NORMAL BRIGHTNESS | O | | |
| | LOW BRIGHTNESS | | O | |
| NOT LESS THAN 5% | NORMAL BRIGHTNESS | | O | |
| | LOW BRIGHTNESS | | O | |
| NOT LESS THAN 20% | NORMAL BRIGHTNESS | | | O |
| | LOW BRIGHTNESS | | O | |

DIGITAL CAMERA AND EXPOSURE CONTROL METHOD OF DIGITAL CAMERA

This application is based on the application No. 11-274400 filed in Japan, the content of which is hereby incorporated by reference.

BACKGROUND OF THE INVENTION

1. Field of the Invention

The present invention relates to a camera such as a digital camera and a silver halide film camera for shooting a subject, and more particularly, to setting of shooting conditions.

2. Description of the Related Art

A camera has previously been known in which the aperture value Av and the exposure time (shutter speed) Tv which are exposure conditions are set by the user when shooting is performed. Moreover, a camera has previously been known in which in order to reduce the load of setting on the user, the aperture value Av and the exposure time Tv previously obtained by use of a relationship Ev=Av+Tv for each of the exposure amounts Ev corresponding to subject brightnesses obtained by photometric means are provided in the form of a table (a program line), and the aperture value Av and the exposure value Tv are automatically set from the obtained exposure amount Ev. In recent years, a camera having a plurality of such program lines has been known.

However, in a case where the exposure conditions are set based on the subject brightness or the like, the shot image is blurred when the subject moves by some amounts. Moreover, in a camera provided with a plurality of program lines, there is a possibility that a good moment to take a picture is missed because of an operation to select an appropriate program line. Further, it is not ensured that an appropriate program line is selected when the subject is moving. Therefore, with these cameras, it is impossible to perform appropriate shooting unless the user has some experience in shooting.

The present invention is made in view of the above-mentioned problem, and an object thereof is to provide a digital camera in which a relative positional displacement (blur) between the subject and the camera can be minimized by automatically setting appropriate exposure conditions according to the movement of the subject.

SUMMARY OF THE INVENTION

To achieve the above-mentioned object, a digital camera according to the present invention comprises: an image sensing unit for sensing a subject image; a detector for detecting a degree of correlation between image data of a plurality of frames from said image sensing unit before shooting; an exposure controller for, in a case where the degree of correlation is low as a result of the detection by said detector, controlling an exposure time of said image sensing unit so as to be shorter than an exposure time in a case where the degree of correlation is high; and a recorder for recording image data from said image sensing unit controlled by said exposure controller.

Further, as another invention for achieving the above-mentioned object, a digital camera comprises: an image sensing unit for sensing a subject image; a detector for detecting a degree of correlation between image data of a plurality of frames from said image sensing unit before shooting; a memory for storing a first program and a second program to control an exposure time of said image sensing unit respectively, wherein the exposure time based on the second program is set to be shorter than the exposure time based on the first program; a selector for selecting the second program in the case where the degree of correlation is lower than a predetermined level; and a recorder for recording image data from said image sensing unit controlled based on the second program.

Further, as another invention for achieving the above-mentioned object, a digital camera comprises: an image sensing unit for sensing a subject image; a detector for detecting a degree of correlation between image data of a plurality of frames from said image sensing unit before shooting; a memory for storing a first program and a second program to control an aperture value of said image sensing unit respectively, wherein the aperture value based on the second program is set to be smaller than the aperture value based on the first program; a selector for selecting the second program in the case where the degree of correlation is lower than a predetermined level; and a recorder for recording image data from said image sensing unit controlled based on the second program.

BRIEF DESCRIPTION OF THE DRAWINGS

In the following description, like parts are designated by like reference numbers throughout the several drawings.

DETAILED DESCRIPTION OF THE PREFERRED EMBODIMENT

Figure 1:
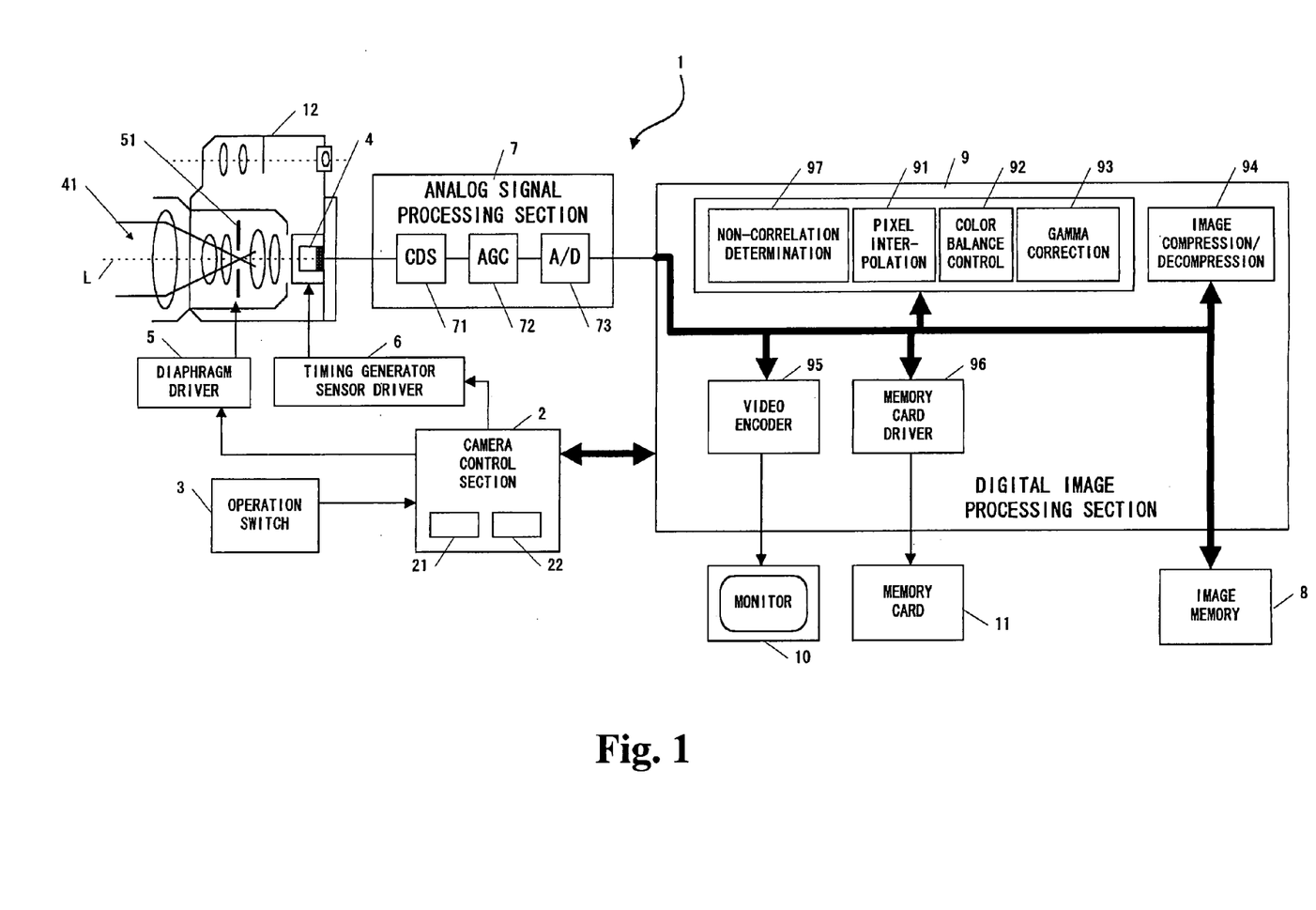
FIG. 1 is a block diagram showing a control configuration of a digital camera according to an embodiment of the present invention.

FIG. 1 is a block diagram showing an embodiment of a control configuration of a digital camera according to the present invention. In FIG. 1, the digital camera 1 comprises: a camera control section (CPU) 2 for controlling shooting in accordance with a shooting control program stored in a data storage section 21; an operation switch 3; an imaging section 4 for forming a subject light image; a diaphragm driver 5 for controlling the aperture of a diaphragm 51 interposed on the optical axis L; a timing generator and sensor driver 6 (hereinafter, abbreviated as driver 6) for controlling the exposure time and charge transfer; an analog signal processing section 7; an image memory 8 serving as a work memory; a digital image processing section 9; and a monitor 10 such as a liquid crystal display. A memory card 11 is designed so as to be detachably attachable to a camera body 12, and has a capacity sufficient for storing image data corresponding to a plurality of frames.

The operation switch 3 has a power switch, an S1 switch for providing an instruction to make shooting preparations, and an S2 switch for providing an instruction to release the shutter (perform shooting). The S1 switch is turned on by half depressing the shutter button. The S2 switch is turned on by fully depressing the shutter button.

The imaging section 4 comprises: solid-state image sensing devices (light receiving section) arranged in a matrix; and a charge transfer section. Moreover, the imaging section 4 is a single-plate area sensor, and on the front surface of a light receiving surface where a subject light image is formed through a taking lens 41, transparent filters of three primary colors are arranged, for example, checkerwise in pixel units.

The diaphragm driver 5 adjusts the aperture of the diaphragm 51 in accordance with the aperture value obtained by the camera control section 2 as described later.

The driver 6 controls charge integration, charge reading and transfer and the like performed on the imaging section 4, in accordance with an instruction from the camera control section 2. In a preview mode (standby mode) before shooting, the driver 6 causes the imaging section 4 to perform shooting every $\frac{1}{30}$ second. At the time of shutter release (shooting), the driver 6 causes the imaging section 4 to perform shooting with the exposure time set by the camera control section 2 as described later.

The analog signal processing section 7 comprises a CDS circuit 71, an AGC circuit 72 and an A/D conversion circuit 73. The analog signal processing section 7 performs a predetermined signal processing on an analog image signal output from the imaging section 4 and then, converts the analog image signal into a digital signal. That is, the CDS circuit 71 reduces reset noise included in the analog image signal. The AGC circuit 72 normalizes the analog image signal by level-correcting (sensitivity-correcting) it. The A/D conversion circuit 73 converts the analog image signal normalized by the AGC circuit 72 into a digital image signal of predetermined bits, for example, 10 bits (hereinafter, this image signal will be referred to as frame image data).

The image memory 8 has a storage capacity corresponding at least to the number of light receiving devices of the imaging section 4. In the image memory 8, the frame image data output from the A/D conversion circuit 73 and the frame image data processed by the digital image processing section 9 are temporarily stored. While it is preferable for the image memory 8 to have a storage capacity corresponding to two frames, the image memory 8 may have a storage capacity corresponding to one frame. When the image memory 8 has a storage capacity corresponding to one frame, the level difference can be extracted by obtaining the difference between the already stored first frame and the second frame in real time.

The digital image processing section 9 performs predetermined signal processing on the frame image data temporarily stored in the image memory 8.

A pixel interpolation section 91 improves resolution by interpolating pixel data between pixel positions of each of red (R), green (G) and blue (B) components. In this embodiment, a CCD area sensor in which pixels corresponding to R, G and B are arranged checkerwise is used as the imaging section 4. Therefore, the frame image of each color is formed as a group of pixel data at pixels arranged in pixel positions other than the pixel positions of the other two colors. For this reason, the image interpolation section 91 interpolates data between pixel data by use of the pixel data obtained at each pixel. To interpolate pixel data, for the frame image of, for example, the G component, masking of the image data constituting the frame image is performed by use of a predetermined filter pattern, and then, using a median filter, the average value of the pixel data remaining when the maximum and the minimum values are removed from the pixel data in the vicinity of a position to be interpolated (peripheral four pixels) is obtained as the pixel data of the position. For the R and the B components, interpolation is performed with the average value of the image data of the peripheral four pixels. Then, the camera control section 2 again stores in the image memory 8 the frame images of the color components having undergone the pixel interpolation.

A color balance control section 92 reads the interpolated image data of the colors from the image memory 8, and level-corrects (gain-corrects) the image data of the colors based on adjustment data set by the camera control section 2, thereby making white balance correction of R, G and B. In the white balance correction, a part of the shot subject that is considered to be white is conjectured from brightness and chroma data, the G-to-R ratio and the G-to-B ratio are obtained from the average value of each of R, G and B of the part, and a correction calculation is performed with the values of the ratios as correction gains of R and B. The corrected image data is again stored in the image memory 8 by the camera control section 2.

A gamma correction section 93 non-linearly converts the level of the image data read from the image memory 8 for each color component by use of a predetermined gamma characteristic, and corrects the white-balance-adjusted image data so as to be suitable for the tone characteristic of the monitor 10, a monitor for external output, a printer (not shown) or the like. The converted image data is again stored in the image memory 8 by the camera control section 2.

An image compression and decompression section 94 compresses for recording the gamma-corrected image data read from the image memory 8, for example, according to JPEG. Moreover, the image compression and decompression section 94 decompresses the compressed image data when the image data is reproduced. A video encoder 95 converts image data into one being compliant with the scanning system of the monitor 10, for example, the NTSC system or the PAL system. A memory card driver 96 controls writing and reading of compressed image data onto and from the memory card 11.

Figure 2:
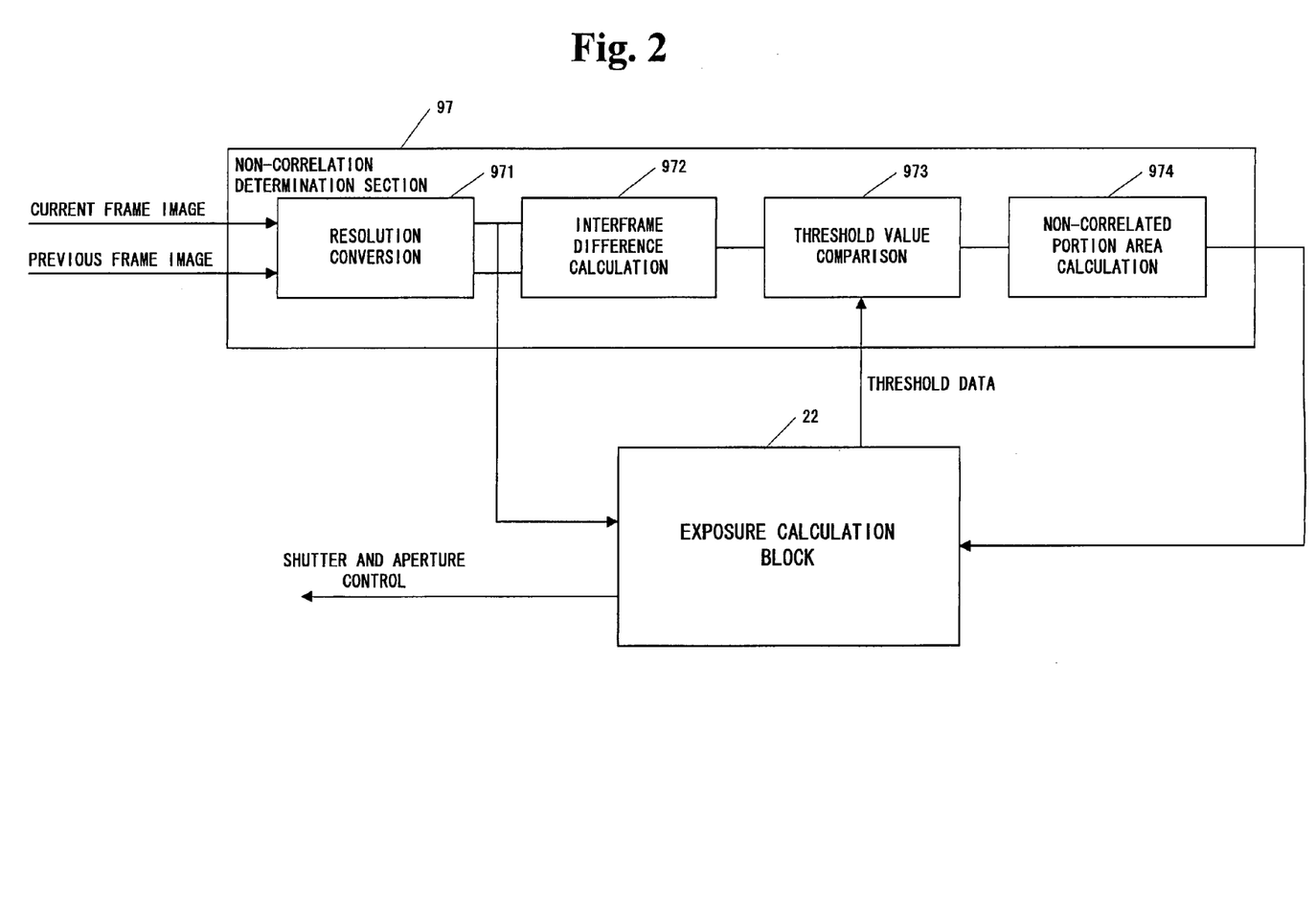
FIG. 2 is a block diagram of a calculation of exposure control values in the digital camera of FIG. 1.

FIG. 2 is a block diagram of a calculation of exposure control values in the digital camera of FIG. 1. In FIG. 2, a non-correlation determination section 97 is provided in the digital image processing section 9, and comprises: a resolution conversion section 971; an interframe difference calculation section 972 as correlated portion detection means; a threshold value comparison section 973; and a non-correlated portion area calculation section 974 as area calculation means.

To reduce the load of correlation processing, the resolution conversion section 971 converts the resolutions of the current (this time) frame image and the previous (last time) frame image captured in the image memory 8 during shooting standby so that the number of pixels constituting the frame images are reduced.

The interframe difference calculation section 972 obtains the level data difference for each corresponding pixels in the current and the previous frame images whose number of pixels has been reduced. In this embodiment, the level data difference is obtained by subtracting the level data of the previous frame image from the level data of the current frame image.

The threshold value comparison section 973 compares the level values of the non-correlated portions (different portions) of the difference-obtained frame images with predetermined threshold value data, removes the non-correlated portions (different portions) whose level values are not more than the predetermined threshold value, and then, extracts the non-correlated portions based on which the subject is judged to move between the frames. Although various comparison methods are considered, in this embodiment, the level data of the previous frame image is subtracted from the level data of the current frame image, and comparison is performed only when the result of the subtraction is a positive value. Alternatively, comparison may be performed when the difference between the level data of the current frame image and the level data of the previous frame image is a negative value, or comparison may be performed irrespective of whether the difference is a positive value or a negative value. In this case, half the obtained number of pixels (corresponding to the area in this embodiment as mentioned later) is treated as the object of evaluation.

The non-correlated portion area calculation section 974 calculates the area of the non-correlated portions, and obtains the ratio of the area of the non-correlated portion to all the detected pixels (non-correlated area ratio). This is equivalent to the ratio between the sum of the pixels of the non-correlated portions and the total number of detected pixels.

An exposure calculation block 22 is provided in the camera control section 2, and outputs the threshold value data to the threshold value comparison section 973 in accordance with the exposure level (contrast) of the current frame image from the resolution conversion section 971. Moreover, the exposure calculation block 22 selects an appropriate program line from among a plurality of program lines in accordance with the non-correlated area ratio supplied from the non-correlated portion area calculation section 974, and sets the exposure control values (the aperture value and the exposure time) at the time of shutter release (shooting) by use of the selected program line.

The camera control section 2 comprises: the data storage section 21 in which a plurality of program lines (P1 to P3 in this embodiment) in addition to a shooting control program are stored; and the exposure calculation block 22. In each of the program lines, a relationship between the exposure time and the aperture value corresponding to an exposure amount is preset.

Figure 8:
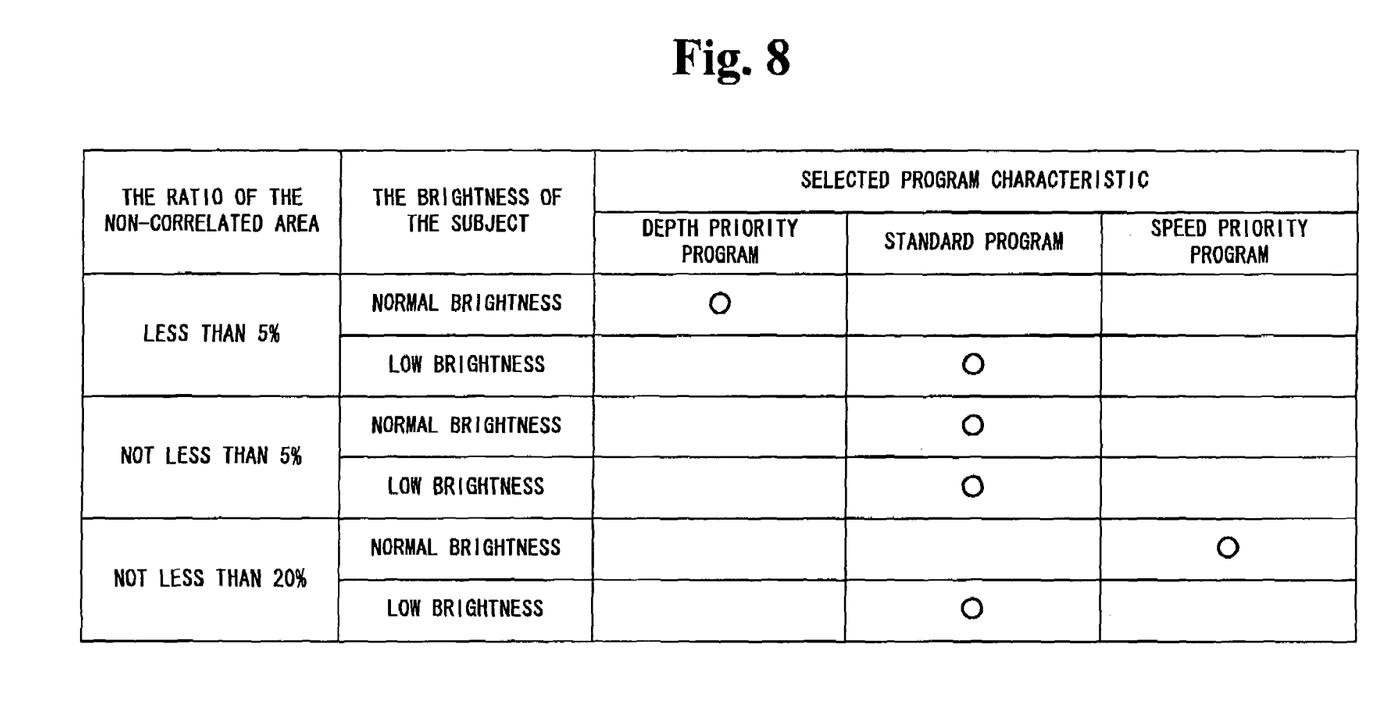
FIG. 8 is a view showing programs selected based on a non-correlated area.

A program line selecting processing will be detailed. FIG. 8 shows programs, to be selected (adopted), suitable for the non-correlated area ratio outputs (area ratio outputs of the moving part of a subject) or the like.

Figure 5:
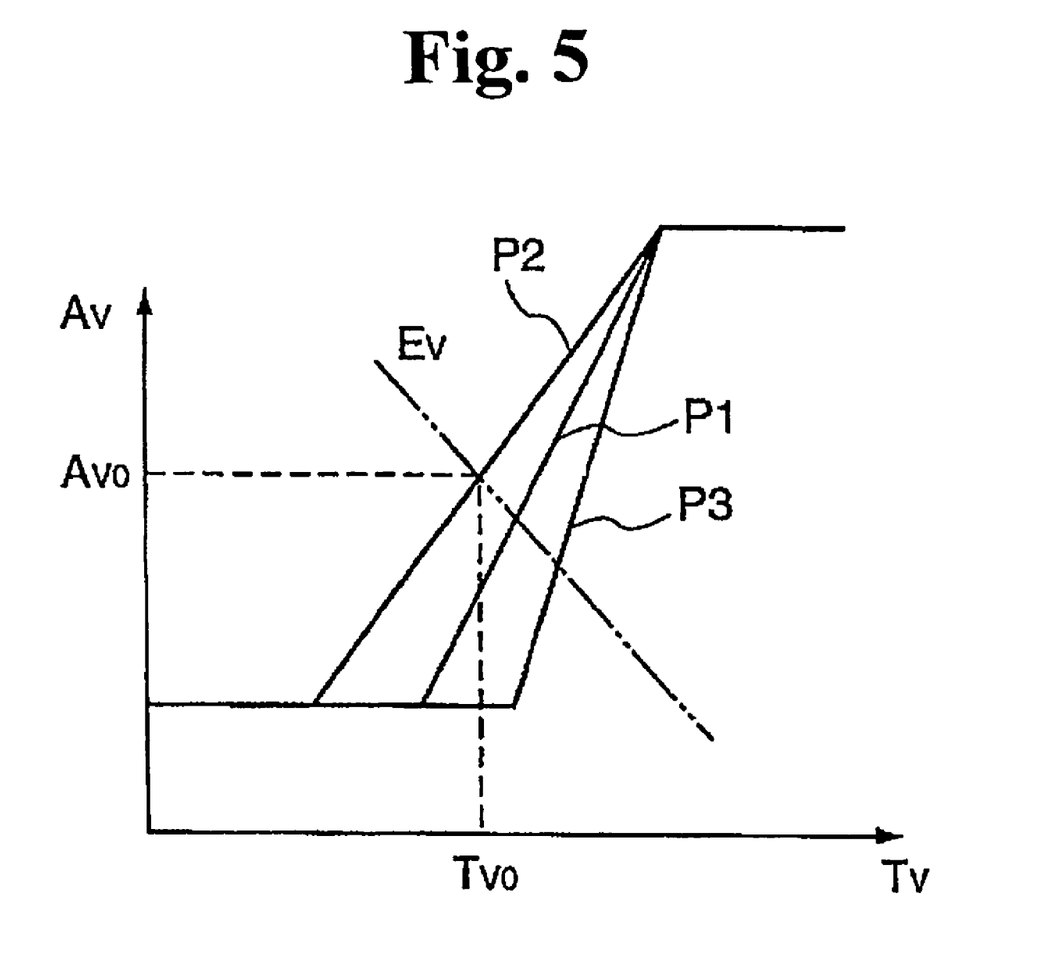
FIG. 5 is a view showing program lines for an exposure value Ev.

In FIG. 8, as the program lines, a standard program line P1, a focus depth priority program line P2 in which the aperture is smaller than that of the standard program line P1, and a speed priority program line P3 in which the exposure time is set to be shorter than that of the standard program line P1 are provided as shown in FIG. 5. In a case where the non-correlated area ratio between the current and the previous frame images is less than five percent, when the subject brightness is normal (not less than a predetermined brightness), the focus depth priority program line P2 is selected, and when the subject brightness is low (less than the predetermined brightness), the standard program line P1 is selected. In a case where the non-correlated area ratio is not less than five percent and less than 20 percent, the standard program line P1 is selected irrespective of the subject brightness. In a case where the non-correlated area ratio is not less than 20 percent, when the subject brightness is normal, the speed priority program line P3 is selected, and when the subject brightness is low, the standard program line P1 is selected.

When the subject brightness is low in the case where the non-correlated area ratio is less than five percent, the standard program line P1 is adopted because if the focus depth priority program line P2 is selected, the exposure time increases and this can cause a camera shake. Therefore, the standard program line P1 is adopted in order to prevent the occurrence of a camera shake as much as possible. Moreover, when the subject brightness is low in the case where the non-correlated area ratio is not less than 20 percent, the standard program line P1 is adopted because if the speed priority program line P3 is selected, an appropriate aperture value cannot be set and this results in underexposure. Therefore, the standard program line P1 is adopted in order to prevent this.

Figure 3A:
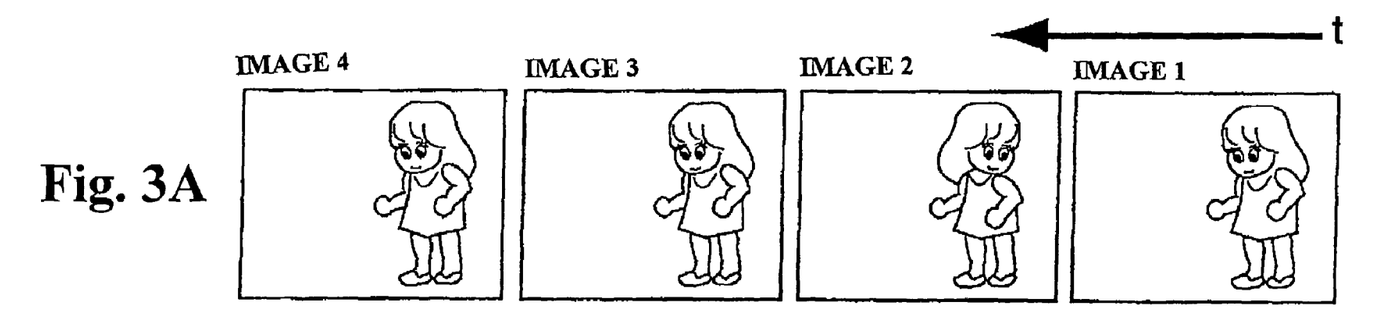
FIG. 3A is a view showing image data of a subject whose movement is comparatively small.
Figure 3B:
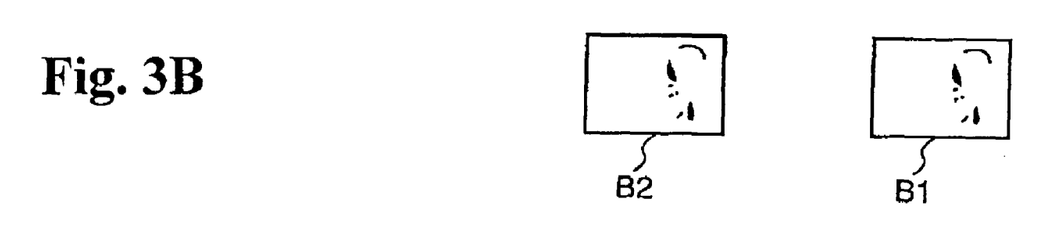
FIG. 3B is a view showing interframe non-correlated portion data corresponding to the image data of FIG. 3A.

FIGS. 3A and 3B show shot images of a subject and non-correlated portion data (the black parts) in a case where the movement of the subject is comparatively small, respectively. In FIG. 3A, images are shot at predetermined intervals like the images 1 to 3, and for example, the difference between the image 2 and the image 1 is obtained to thereby obtain non-correlated portion data B1. When the S1 switch is depressed after the image 3 is captured, the difference between the image 3 and the image 2 is obtained to thereby obtain non-correlated portion data B2. When it is determined that the area ratio of the non-correlated portion data B2 is less than five percent, it is determined that the movement of the subject relative to the camera is also small, so that the focus depth priority program line P2 is selected. Consequently, the aperture value is set to be higher than the aperture value in a normal operation state (in a case where the standard program line P1 is selected). This increases the depth of focus. Even though the exposure time increases as the aperture decreases, since the movement of the subject is small, problems do not readily arise such that it is difficult to focus the camera on the subject and that a camera shake is apt to occur. When the S2 switch is depressed under this state, a shot image of the subject in which there is no blur like the image 4 is recorded. When the subject brightness is low, the standard program line P1 is adopted for the above-mentioned reason.

Figure 4A:
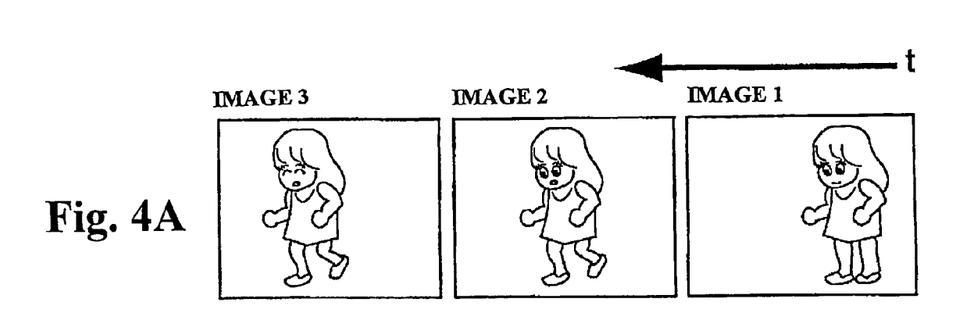
FIG. 4A is a view showing image data of a subject whose movement is comparatively large.
Figure 4B:
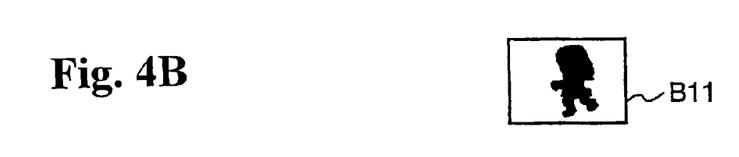
FIG. 4B is a view showing interframe non-correlated portion data for the image data of FIG. 4A.
Figure 4C:
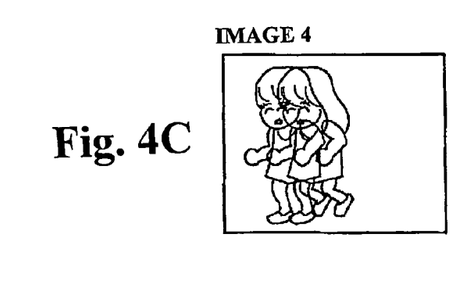
FIG. 4C is a view showing an image blurred because of exposure in accordance with a standard program line.

A case where the movement of the subject is comparatively large will be described with reference to FIGS. 4A to 4C. FIGS. 4A, 4B and 4C show shot images of a subject, non-correlated portion data (the black part) and an image shot by use of a program exposure employing the standard program line P1 (the image 4), respectively. In FIG. 4A, images are shot at predetermined intervals like the images 1 and 2 (preceding images are not shown). For example, it is assumed that the difference between the image 2 and the image 1 is obtained to thereby obtain non-correlated portion data B11. When the S1 switch is depressed while the image 2 of FIG. 4A is being captured, the degree of correlation is evaluated for the non-correlated portion data B11 obtained from the difference between the image 2 and the image 1.

When it is determined that the area ratio of the non-correlated portion data B11 is not less than 20 percent, it is determined that the movement of the subject is large, so that the speed priority program line P3 is selected. Therefore, when an instruction to release the shutter is provided here, the speed priority program line P3 is adopted, so that the exposure time is set to be shorter than the normal exposure time. Consequently, even when the movement of the subject is somewhat fast, the shot image of the subject does not readily blur as shown in the image 3 of FIG. 4A.

On the contrary, when an instruction to release the shutter is provided under the standard program line P1 in the case where the area ratio of the non-correlated portion data B11 is not less than 20 percent, as shown in the image 4 of FIG. 4C, the shot image of the subject blurs because the movement of the subject is fast, so that an unsharp image is obtained.

When the area ratio of the non-correlated portion data B11 is not less than 5 percent and less than 20 percent (when the condition of the subject movement is normal), the standard program line P1 is selected as the appropriate program line.

Figure 6:
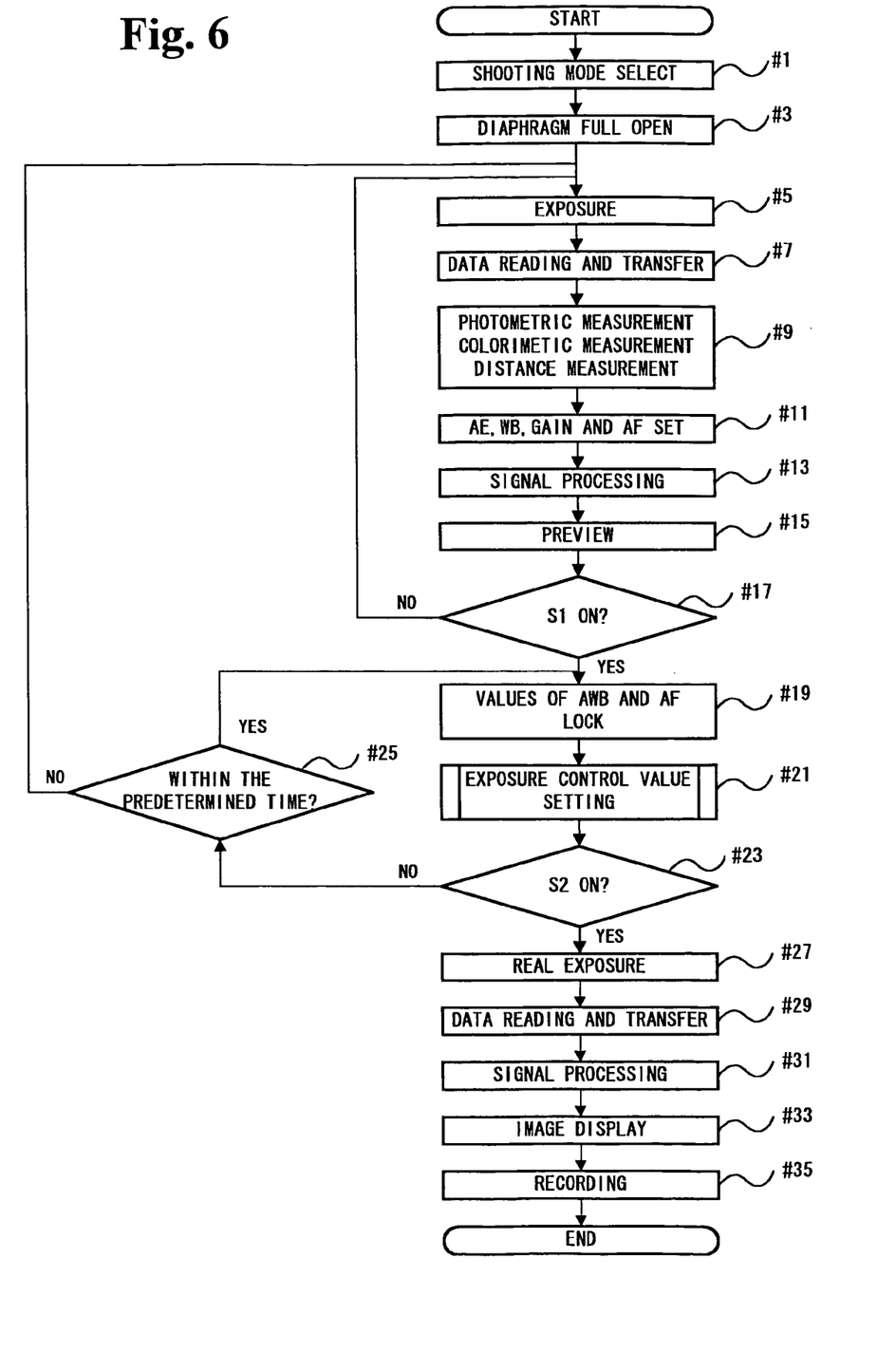
FIG. 6 is a flowchart showing an operation of the digital camera of FIG. 1.

FIG. 6 is a flowchart showing an example of an operation of the digital camera shown in FIG. 1. As shown in FIG. 6, when the shooting mode is selected with the power switch (not shown) on (#1), the aperture of the diaphragm 51 is controlled so as to be maximum at step #3, so that the digital camera is brought into a preview state.

When shooting is performed with a predetermined exposure time (charge integration time) at step #5 and shooting is finished, data reading and data transfer are performed at step #7. Then, at step #9, calculations of photometric measurement of the subject brightness (for exposure control), calorimetric measurement (for WB control) and distance measurement (for AF control) are performed. Then, at step #11, based on the results of the calculations at step #9, AE (exposure control value) in accordance with the normal program line P1, WB (white balance), gain and AF (auto-focus) are set. Then, after predetermined signal processings such as white balance adjustment and gamma correction are performed on the shot image at step #13, the processed frame image is shown for preview on the monitor 10 through the video encoder 95 (the frame image is shown as a moving image) (step #15).

Then, whether the S1 switch is on or not is determined at step #17. When the S1 switch is not on, the process returns to step #5, and steps #5 to #15 are repeated. When the S1 switch is on at step #17, the values of AWB and AF are locked (step #19), and the exposure amount Ev obtained immediately before the S1 switch is turned on and the exposure control values (the aperture value and the exposure time) are decided (step #21). The processing to decide the exposure control values will be described later. On the monitor 10, the image shot immediately before the S1 switch is turned on is fixedly displayed.

Then, whether the S2 switch (release switch) is on or not is determined (step #23). When the S2 switch is not on, whether the S1 switch continues being on for a predetermined time or not is determined (step #25). When the S1 switch continues being on within the predetermined time, the current state is maintained. When the S1 switch continues being on for not less than the predetermined time, it is determined that the user has no intention to perform shooting, and the process returns to step #5. When the S2 switch is on at step #23, at step #27, the imaging section 4 is reset, charge integration is performed for the set exposure time and then, the integrated charge is transferred (end of exposure). That is, based on the aperture value (aperture amount) of the diaphragm 51 and the exposure time set in accordance with the selected program line (step #21), shooting of the subject (real exposure) is performed by the imaging section 4.

Then, the image data is read at step #29. The read image data undergoes predetermined signal processings such as pixel interpolation, color balance adjustment, gamma correction and image compression at the analog signal processing section 7 and the digital image processing section 9 (step #31), and is then stored in the image memory 8. Then, the processed image is displayed as a still image on the monitor 10 (step #33) and is also recorded onto the memory card 11 by the memory card driver 96 (step #35).

Then, the diaphragm 51 is returned to the maximum aperture state through the diaphragm driver 5, and image capture is performed under this state.

In the reproduction mode, the compressed data recorded on the memory card 11 is read out into the image compression and decompression section 94 through the memory card driver 96, and the data is decompressed into the original image data. Then, the image data is converted into a video signal of a scanning format supported by the video encoder 95 and is displayed on the monitor 10. By turning off the power switch 3, shooting is finished.

Figure 7:
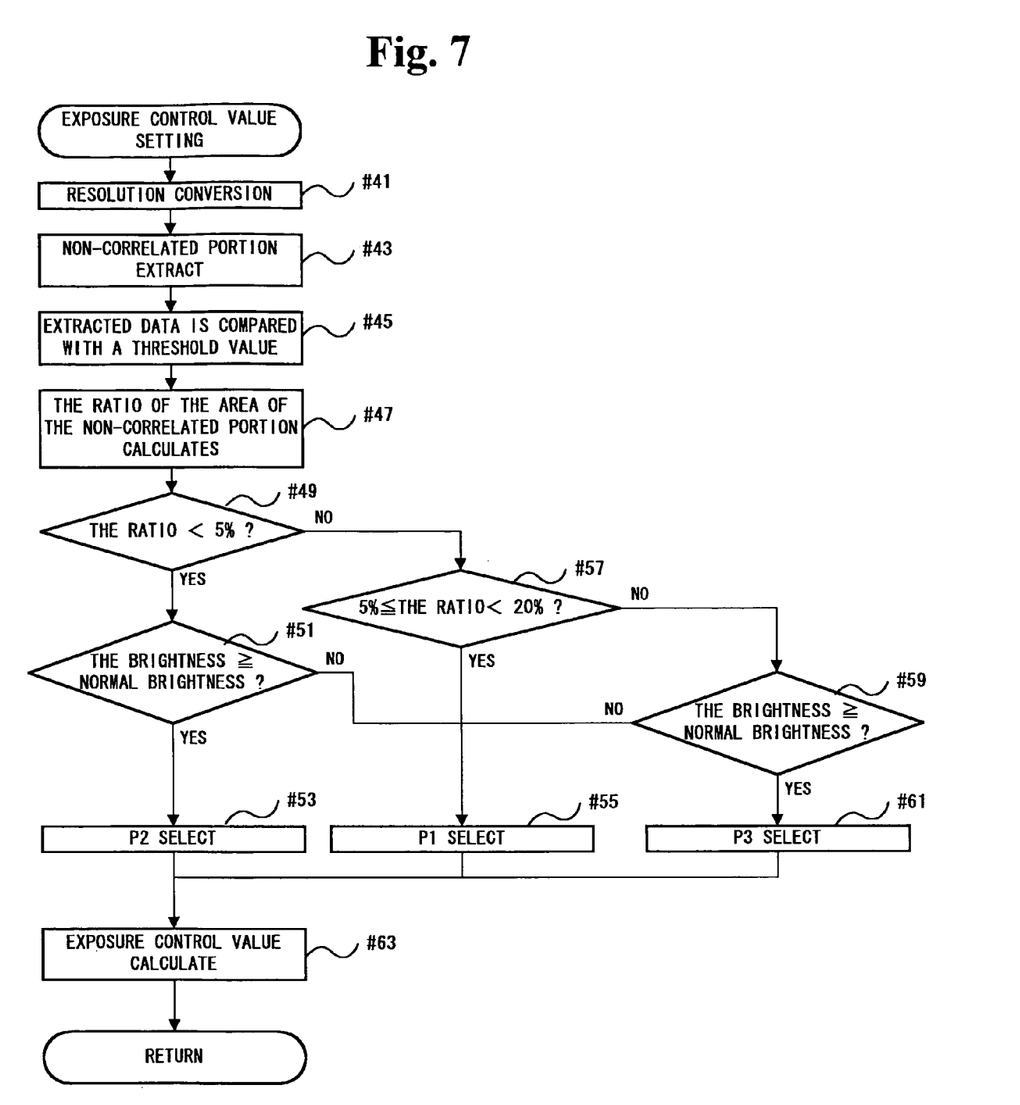
FIG. 7 is a flowchart detailing an exposure control value setting processing of FIG. 6.

FIG. 7 is a flowchart explaining the exposure control value setting processing of FIG. 6 (#21). As shown in FIG. 7, first, at step #41, the current frame image and the previous frame image are resolution-converted to thereby reduce the number of pixels. Then, at step #43, the level data difference is obtained for each corresponding pixels of these frames to thereby extract an interframe non-correlated portion. Then, the extracted data is compared with a threshold value at step #45 and the data of a level not less than the threshold value level is extracted as a non-correlated portion (portion with no correlation), and then, the ratio of the area of the non-correlated portion to all the detected pixels is obtained at step #47.

Then, whether the non-correlated portion area ratio is less than five percent or not is determined at step #49. When the non-correlated portion area ratio is less than five percent (YES), whether the subject brightness is not less than the normal brightness (predetermined brightness) or not is determined at step #51. When the subject brightness is not less than the normal brightness (YES), it is determined that the subject is stationary, so that the focus depth priority program line P2 is selected at step #53. When the subject brightness is less than the normal brightness (NO, low brightness) at step #51, the standard program line P1 is selected at step #55.

When the non-correlated portion area ratio is not less than five percent (NO) at step #49, whether the non-correlated area ratio is less than 20 percent or not is determined at step #57. When the non-correlated area ratio is not less than five percent and less than 20 percent (YES), it is determined that the speed of the subject movement is normal, and the normal program line P1 is selected in either of the cases of normal brightness and low brightness (step #55). When the non-correlated area ratio is not less than 20 percent (NO) at step #57, it is determined that the speed of the subject movement is faster than the normal speed. Then, whether the subject brightness is not less than the normal brightness or not is determined at step #59. When the subject brightness is higher than the normal brightness (YES), the speed priority program line P3 is selected at step #61. When the subject brightness is lower than the normal brightness (NO) at step #59, to prevent underexposure, the normal program lines P1 is selected at step #55.

Then, at step #63, the exposure control values (the aperture value and the exposure time) are set based on an appropriate program line selected in accordance with the magnitude of the subject movement (the magnitude of the area ratio).

As described above, when the speed of the subject movement is fast, it is determined that a blurred picture is likely to be obtained with the aperture value and the exposure time of the normal operation state, so that exposure is performed at high speed in accordance with the speed priority program line P3. When the speed of the subject movement is low, image blur does not readily occur even when exposure is performed at low speed in accordance with the focus depth priority program line P2, and since the aperture is reduced, the depth of field is large, so that a plurality of subjects is easily in focus as a whole. In any case, most suitable exposure with few blurs can be realized. Since the normal program line P1 is selected to avoid underexposure when the subject brightness is low, appropriate exposure control values corresponding to the subject movement can be automatically set.

In this embodiment, the non-correlated portion area calculation section 974 is structured so as to calculate the area of the non-correlated portion and obtain the ratio (non-correlated area ratio) of the area of the non-correlated portion to all the detected pixels. However, the section 974 may be structured so as to calculate the number of pixels of the non-correlated portion obtained by the interframe difference calculation section 972 and decide the degree of image correlation based on the number of pixels. Moreover, the section 974 may be structured so as to decide the degree of image correlation based on the area (not the area ratio) corresponding to the number of pixels of the non-correlated portion. Further, the section 974 may be structured so as to decide the degree of image correlation based on the area ratio to a predetermined area smaller than the total area.

Moreover, in this embodiment, to evaluate the degree of the subject movement, the interframe difference is obtained for each corresponding pixels, an interframe non-correlated portion is extracted and the ratio of the area of the non-correlated portion is obtained. However, a correlated portion may be extracted to obtain the ratio of the area of the correlated portion. In this case, the higher the ratio of the area of the correlated portion is, the slower (smaller) the subject movement is.

Further, in this embodiment, the subject movement condition is determined among the following three: a moving condition in which the movement is fast (vigorous); a moving condition in which the movement is normal; and a stationary condition in which the movement is slow (small), and the exposure control values are set based on the result of the determination. However, the present invention is not limited thereto. The subject movement condition may be determined between two conditions of a moving condition and a stationary condition, or may be determined among four or more movement conditions. The exposure control values may be set in accordance with the result of the determination. In this case, program lines corresponding to the number of movement conditions are provided.

As the method of setting the exposure control values for the subject movement condition, instead of storing a plurality of program lines, coefficients for a standard program line may be provided in a storage section so that the exposure control values (the exposure time and the aperture value) are obtained by multiplying the standard program line by the corresponding coefficient in accordance with the result of detection of the correlation ratio.

The present invention enables a relative positional displacement (blur) between the subject and the camera to be minimized as a consequence in addition to the degree of subject movement.

As described above, according to this embodiment, the degree of correlation between shot subject images is evaluated and based on the result of the evaluation, an appropriate exposure time corresponding to the subject movement is automatically set. Consequently, subject image blur can be minimized.

Moreover, according to this embodiment, since the degree of correlation can be evaluated from the entire area of a subject image (that is, the frame image), the precision of the evaluation can be increased.

Moreover, according to this embodiment, by detecting a correlated portion (or a non-correlated portion) of subject images, the subject movement condition can be easily and precisely determined. Further, since the degree of correlation can be evaluated only by using the difference between level data which is pixel data, the structure for the evaluation can be simplified.

Further, according to this embodiment, since the exposure time is automatically set to be short in accordance with the subject movement when it is determined that the correlation between frame images is low, image blur of a moving subject can be prevented. When the subject movement is slow, since no image blur is caused, shooting can be performed with the depth of field being large.

Further, according to this embodiment, the possibility can be minimized that the exposure time increases because of low brightness to cause a camera shake.

Moreover, according to this embodiment, since the imaging section for images for recording (shooting) and the imaging section for producing image data for determining the correlation are common, it is unnecessary to separately provide these imaging sections, so that cost and size reduction can be achieved.

Although the present invention has been fully described by way of examples with reference to the accompanying drawings, it is to be noted that various change and modifications will be apparent to those skilled in the art. Therefore, unless otherwise such changes and modifications depart from the scope of the present invention, they should be construed as being included therein.

What is claimed is:

1. A digital camera comprising:
   an image sensing unit for sensing a subject image;
   a resolution reducer for reducing image data of a frame sensed by said image sensing unit;
   a detector for detecting a degree of correlation between reduced image data of a plurality of frames from said resolution reducer before shooting;
   an exposure controller for, in a case where the degree of correlation is low as a result of the detection by said detector, controlling an exposure time of said image sensing unit so as to be shorter than an exposure time in a case where the degree of correlation is high; and
   a recorder for recording image data from said image sensing unit controlled by said exposure controller.

2. A digital camera according to claim 1, further comprising a comparator for comparing a pixel level difference between the reduced image data of the plurality of frames with a predetermined threshold value.

3. A digital camera according to claim 2, wherein said detector detects the degree of correlation according to the number of the pixels for which the same comparison result is obtained.

4. A digital camera according to claim 3, wherein said detector detects the degree of correlation according to the ratio between the number of the pixels and a predetermined number of pixels.

5. A digital camera according to claim 2, wherein said detector detects the degree of correlation according to the sum of the pixels for which the pixel level difference is not less than the predetermined threshold value.

6. A digital camera according to claim 5, wherein said detector detects the degree of correlation according to the ratio between the sum of the pixels and a predetermined number of pixels.

7. A digital camera according to claim 1, further comprising a display for displaying the image reduced by said resolution reducer before shooting.

8. An exposure control method of a digital camera, comprising the steps of:

sensing a subject image by an image sensing unit;

reducing image data of a frame sensed by said image sensing unit;

detecting a degree of correlation between reduced image data of a plurality of frames from said image sensing unit before shooting;

in a case where the degree of correlation is low as a result of the detection, controlling an exposure time of said image sensing unit so as to be shorter than an exposure time in a case where the degree of correlation is high; and recording image data from said controlled image sensing unit.

* * * * *